United States Patent [19]

McClenahan et al.

[11] 4,448,838
[45] May 15, 1984

[54] GRAPHITE FIBER REINFORCED LAMINATE STRUCTURE CAPABLE OF WITHSTANDING LIGHTNING STRIKES

[75] Inventors: David H. McClenahan, Reno, Nev.; John A. Plumer, Dalton, Mass.

[73] Assignee: Lear Fan Corp., Reno, Nev.

[21] Appl. No.: 299,346

[22] Filed: Sep. 4, 1981

[51] Int. Cl.³ .............................................. B32B 9/00
[52] U.S. Cl. ..................................... 428/251; 428/256; 428/408; 428/902; 428/922
[58] Field of Search ............... 428/251, 256, 408, 922, 428/902

[56] References Cited

U.S. PATENT DOCUMENTS 3,288,175  11/1966  Valko .................................. 139/425
3,678,675  7/1972  Klein .................................. 428/922

Primary Examiner—Marion McCamish
Attorney, Agent, or Firm—Lyon & Lyon

[57] ABSTRACT

A graphite fiber reinforced laminate structure capable of withstanding the damaging effects of lightning strikes, comprising at least one graphite fiber bonded ply having metal wire or metal coated filament woven therein in the warp and fill directions, said metal wire or filament being compatible with said bonded graphite fibers.

14 Claims, 4 Drawing Figures

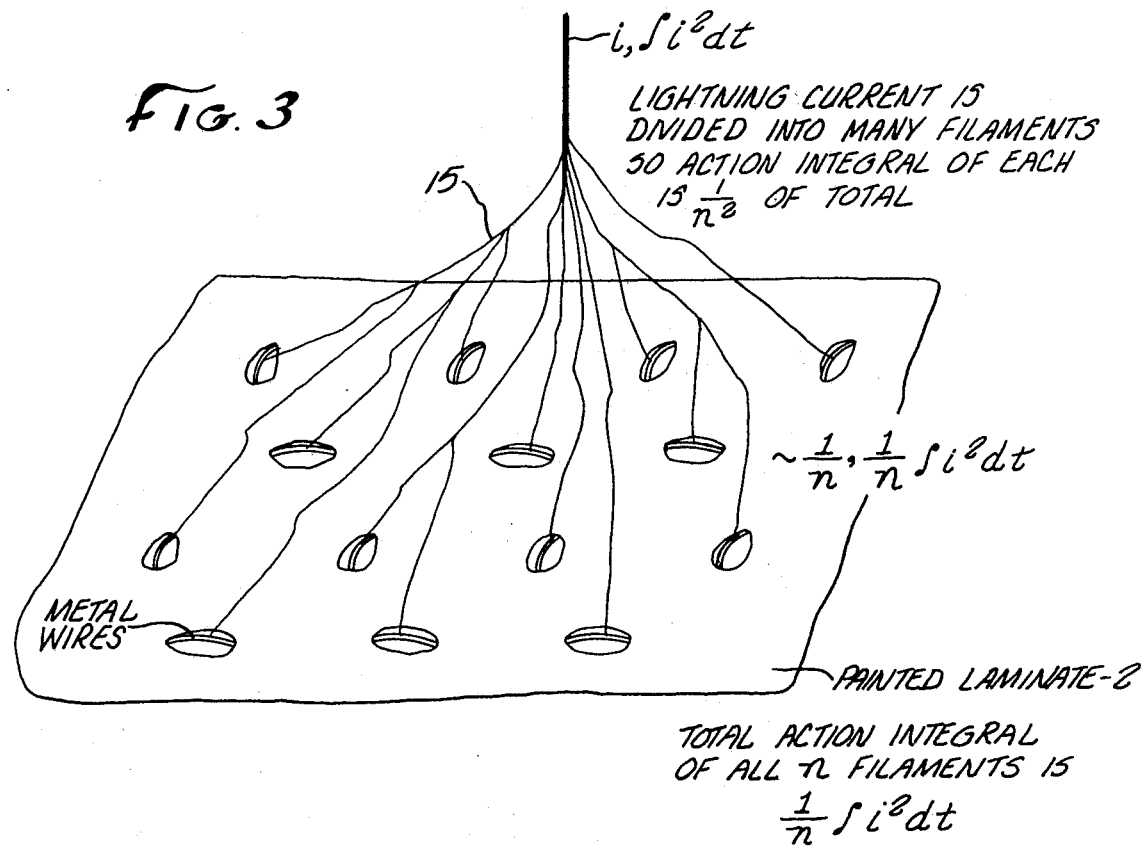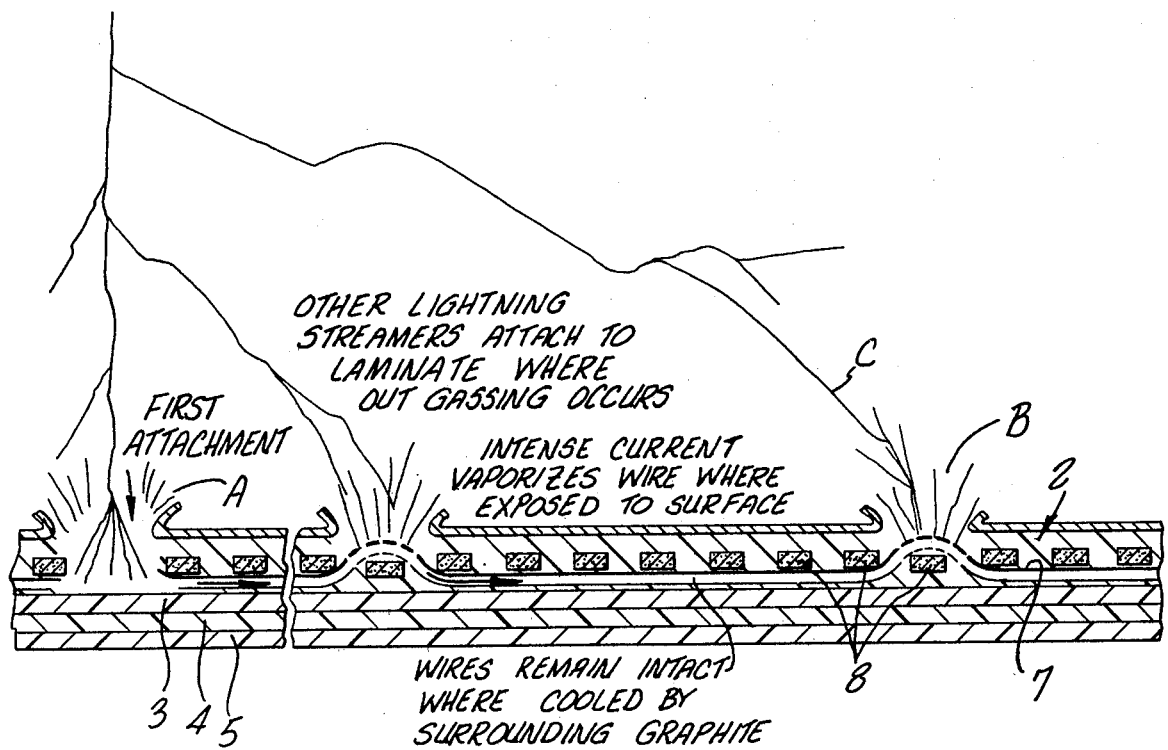

GRAPHITE FIBER REINFORCED LAMINATE STRUCTURE CAPABLE OF WITHSTANDING LIGHTNING STRIKES

BACKGROUND OF THE INVENTION

It is now well known that graphite reinforced composite materials are susceptible to puncture or other severe damage from lightning strikes. This is because the density of the lightning current injected into the graphite fibers at the point of attachment of the lightning arc is high enough to raise the temperature of the graphite fibers well above the vaporization temperature of the resin matrix. This in turn results in explosive pyrolysis of the resin, pressure buildup, and the destruction of several plies of the composite laminate. Moreover, if the laminate is painted, as is ordinarily the case, it has been found that the paint will tend to concentrate the lightning current at a single point, rather than allow it to divide and enter the laminate at several places, and that it will contain the thermal and blast presure effects of the lightning strike, thus enabling them to build up to a greater magnitude. Both of these effects, of course, increase the amount of physical damage to the laminate.

In addition to the physical damage, the higher resistivity of graphite composites, a resistivity approximately five hundred times greater than that of aluminum, for example, results in excessive structural voltage rises during lightning strike flow. Such structural voltage increases may cause damage to the electrical and avionics equipment contained within an airplane, for example, as well as electrical sparking within the fuel tank.

In light of the foregoing, it is clear that it is necessary to minimize the physical damage effects of lightning strikes on graphite composites and to reduce the electrical resistance of such composites. In an attempt to achieve this, a flame of arc-sprayed coating of metal, usually aluminum, of approximately 4 and 6 mils thickness has been applied to the composite, but such flame-sprayed coatings suffer from the disadvantages of being difficult to apply and to maintain and are subject to cracking, which can lead to corrosion and/or blemishes when applied to large surfaces as would be necessary in the case of a structure such as an airplane or other aerospace vehicle.

To provide the required protection for graphite composites, it has also been attempted to add a ply of aluminized glass fabric or a ply of woven wire mesh to the laminate structure. It has been found, however, that unless a symmetrical layup is used, i.e., a ply on the inside as well as on the outside surface of the graphite laminate, aluminized glass cloth may cause warpage of the laminate.

Woven wire mesh has also been found to be difficult to lay up on multiple contoured surfaces. Also, the addition of either the aluminized glass cloth or woven wire mesh would add a significant amount of weight to the laminate structures, which is highly undesirable, especially in the case of an airplane or other aerospace vehicle, where the lighter weight of the graphite composite is an exceptionally desirable attribute and one which contributes to improved fuel consumption.

SUMMARY OF THE INVENTION

It is an object of the present invention, therefore, to provide graphite fiber reinforced laminates which are capable of withstanding the damaging effects of lightning strikes.

It is a further object of this invention to provide graphite reinforced laminates having the desired protection against lightning but which also are light in weight and suitable for use in the manufacture of airplanes and other aerospace vehicles such as helicopters and missiles.

Graphite reinforced bonded laminates are protected from the effects of lightning by the present invention in which metal wire or metal coated filament is woven in at least the outer ply of the graphite reinforced laminate structure to increase the capability of the laminate to withstand lightning strike currents without significant damage. The metal wires or filaments do not significantly degrade the mechanical properties of the graphite fibers or the graphite reinforced laminate composite and are woven bidirectionally among the graphite fibers, that is, in both the warp and fill directions. The diameter of the wire will be generally in the range of approximately 0.5 mils to about 20 mils and, in a preferred embodiment is in the range of approximately 1 mil to about 10 mils. The wires are positioned within the ply such that there is at least 1 wire per 6 tows of the graphite fibers in a ply which has 24 tows per inch.

Other objects, features and advantages of the present invention will be apparent to those skilled in the art after reading the following more detailed description of the invention.

DESCRIPTION OF THE DRAWINGS

FIGS. 2 through 4 are schematic representations of the manner in which the present invention is believed to function in reducing the degree of damage to the graphite fiber reinforced bonded composite due to lightning strikes.

DESCRIPTION OF PREFERRED EMBODIMENTS

Figure 1:
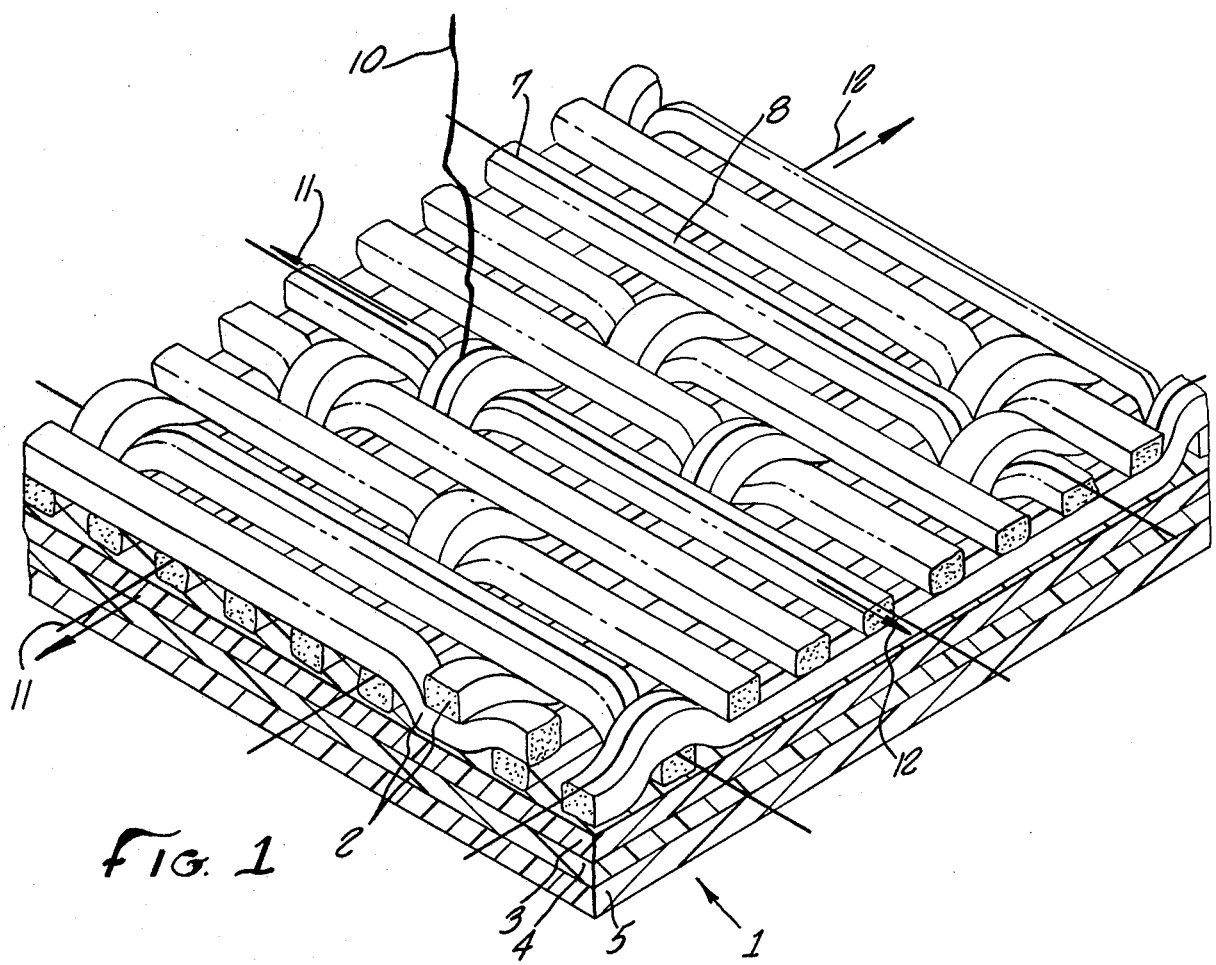
FIG. 1 is a schematic representation of a laminate structure according to the present invention in which metal wire or metal coated filaments are illustrated in the exterior ply.

As shown in FIG. 1, the laminate structure of the present invention, designated generally by the numeral 1, has a plurality of graphite fiber reinforced bonded plies 2 through 5, with the exterior ply 2 having metal containing wire 7 woven bidirectionally among the graphite fibers 8, that is, in both the warp and fill directions. As indicated previously, the wire or filament has a diameter generally within the range of approximately 0.5 mil to approximately 20 mils and is spaced within the ply such that there is at least 1 wire per 6 tows of graphite fibers in a ply which has 24 tows per inch.

For protection of graphite laminates in lightning strike zone 1A (with an intensity of 200 kiloamperes at an action integral of $2 \times 10^6$ ampere$^2$-seconds as set forth in Society of Automotive Engineers Report, "Lightning Tests Waveforms and Techniques for Aerospace Vehicles and Hardware" dated June 20, 1978, and U.S. MIL STD 1757), a preferred embodiment has one 4 mil wire in every third tow in a ply with 24 tows per inch. For protection of laminates subjected to other lightning strike intensities, as, for example, in zones 2A or 1B (see the above-identified references) or for achievement of other degrees of protection of the exterior ply, other wire sizes and spacings may be appropriate, as for example, when a laminate structure containing only one or two graphite reinforced bonded plies is to be utilized and puncture cannot be tolerated. In such a case, an arrangement of one or more metal wires or filaments in each tow, or larger diameter wires, may be used.

The metal wire or metal coated filament is of a material which is compatible with the bonded graphite fibers and preferably is aluminum, which has been found to produce extremely satisfactory results. In this regard, it should be noted that the highly satisfactory compatibility of aluminum wire and graphite fibers is surprising since aluminum and graphite are at opposite ends of the electrogalvanic scale. Nevertheless, when the laminate is painted or other steps taken to protect the wire from moisture and inhibit galvanic action from occurring, aluminum wire has been found to be highly satisfactory. The metal wire may also be tin, titanium, brass, gold, silver, platinum, copper, nickel, nickel-stainless steel alloys, stainless steel, or other metal or metal alloy possessing the requisite compatibility, as explained more fully below. Alternatively, the wire may also be a non-metallic fiber such as graphite, fiberglass or Kevlar (a trademark of E. I. duPont de Nemours & Co. for organic fibers) coated with one of the aforementioned metals.

The major criteria applied in selecting the appropriate metal wire or filament are that it have sufficient electrical conductivity to enable a portion of the lightning current to be conducted away from the lightning attachment point(s), thereby reducing the energy deposited in the laminate at the strike attachment points; that it present a sufficient electric field intensification at the surface of the laminate to promote multiple lightning attachment points; that it be galvanically compatible with the surrounding graphite or capable of being made so as for example by coating aluminum wire with tin or other appropriate metal; and that it be sufficiently light to enable the laminate composite to retain this essential characteristic.

The number of plies comprising the composite laminate structure, of course, may vary considerably, depending upon the intended use of the composite and will be governed in large part by the necessary weight and overall strength that are required. Where the laminate structure is to be used for the fuselage or the wings of an airplane, for example, multiple plies will usually be utilized. In such a case, to provide the necessary protection against the damaging effects of lightning strikes, at least the exterior surface of the laminate structure will have the described woven metal containing wire, and in cases where additional protective insurance is desired, the next inner ply (numeral 3 in FIG. 1) may also have the woven metal containing wire.

Figure 2:
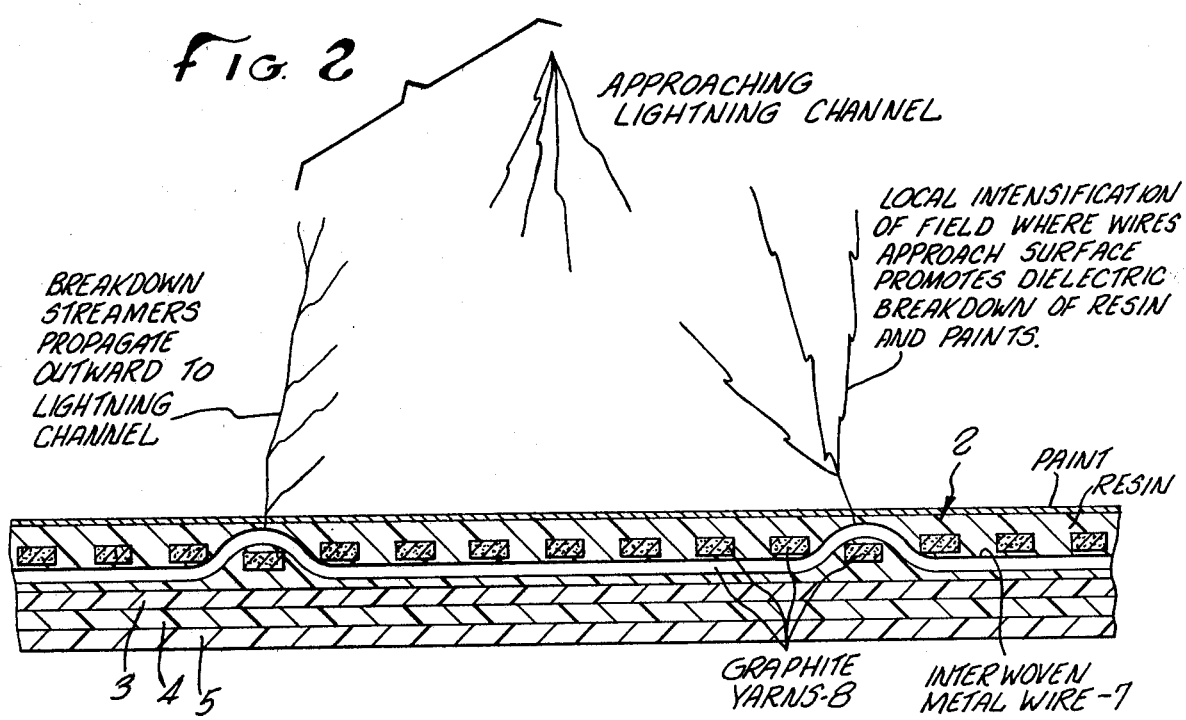

At this point, reference is again made to FIG. 1 and to FIGS. 2, 3, and 4 which illustrate the mechanisms by which the present invention is believed to provide the desired protection against lightning strike effects.

As illustrated in FIG. 1, the arrangement of metal wires or filaments interwoven in both the warp and fill directions enables currents entering the laminate (depicted by numeral 10) at any point(s) to spread in all directions (depicted by numerals 11 and 12). It is not necessary for the wires to conduct all of the lightning current, but only a portion of it, so that the portion of lightning current which remains in the graphite is reduced and the amount of energy deposited in the graphite is reduced, thereby reducing the amount of thermal damage. In addition to this mechanism, two other mechanisms contribute to the protection effectiveness of the interwoven wires where the wires or filaments overlap. As illustrated in FIG. 2, the interwoven wires are adjacent at least the outside surface of the outer ply at periodic intervals at the places of interweaving or overlapping; the interwoven wires may also be adjacent both the upper and lower surfaces of the ply, depending upon the thickness of the resin bonding, and in either case will facilitate conduction of electric currents from the ply, as will now be explained. As the lightning channel approaches the aircraft, the electric field is intensified locally where the wires are adjacent to the surface of the laminate and dielectric breakdown of the resin and paint occurs and ionized streamers propagate outward to intercept the lightning channel. This is the same effect that causes lightning strikes to seek out the edges of flush rivets beneath paint on metal aircraft skins.

The interwoven wires thus not only lower the density of lightning current in the graphite but at the same time serve to split the lightning arc into a plurality of filaments as shown in FIG. 3. The corresponding division of the current into separate current filaments 15 (the letter n in the following equation) results in a decrease of the action integral associated with each filament by a factor of $1/n^2$ as follows:

$$\int \left(\frac{i}{n}\right)^2 dt = \frac{1}{n^2} \int i^2 dt$$

so that (a) the damaging effect at each filament attachment spot is much lower than it would be in the case where all current enters the laminate at one spot, and (b) the sum of the action integrals associated with all n current filaments is $1/n$ times that of the total current if conducted in a single arc. If the current can be split up, its damaging effects would therefore be greatly reduced.

Still another mechanism is illustrated in FIG. 4. Immediately following initial current entry into the wires (A) and near the first lightning attachment point(s), some of the wires will vaporize where exposed to the surface (B). The vaporized products will burst through the paint and promote additional attachment points (C) which will share current and reduce the action integral associated with each entry in the same manner as described in FIG. 3.

An additional advantage of providing interwoven wires in the outer ply of a multiple ply laminate is that a greater percentage of the lightning current is encouraged to flow in the outer ply and a correspondingly lower percentage enters the inner plies, thereby reducing the damage to the inner plies.

The mechanisms described above serve to protect the graphite laminate from the damaging effects of direct lightning attachment, which is one of the primary objects of this invention. An additional advantage afforded by this invention, however, is that by reduction of overall laminate resistance, the structural voltage rises that occur as lightning currents flow in these laminates are also reduced, thereby improving the protection afforded internal electrical and avionics systems.

To form the laminate structure of this invention, a graphite fiber cloth, such as that available from Fiberite Corporation under the trade designation W-133, into which the wire or metal filaments have been interwoven, is impregnated with a suitable organic resin which is not in a fully polymerized or cured state. Subsequently, the resin is cured under exposure to heat and in some instances high pressure. Epoxy based resins are typically utilized in conjunction with graphite fibers (although other resins may also be used), and final polymerization or curing is conducted at about 250°–350° F. for approximately ½ to about 3 hours. The exact parameters of the aforementioned curing are, of course, dependent on the chemical properties of the resinous binding material and will be known or readily ascertainable by those skilled in the art.

To confirm the improved results of the present invention, a group of twelve inch square specimens were prepared embodying the laminate structure of the present invention.

Specimens containing three different wire spacings of interwoven aluminum wire and one interwoven brass wire material were prepared. The specimens were 12 inch by 12 inch, 4 plies thick. The lay up configuration was ±45°, 0°–90°, 90°–0°, ±45° and the outer ply contained the interwoven wire. The panels were tested and the results are shown in Table I which follows. The wire diameter for all specimens was 4 mils. Each of the painted specimens were painted with one coat of primer and two coats of enamel prior to testing. In all of the tests, current was delivered to the specimen from an electrode suspended 1 inch above the center and current was removed from the top and bottom of all four edges of the specimens via clamped aluminum bars on two opposite edges and aluminum foil taped on the other two edges.

TABLE I

Interwoven Wire Test Results

| SPEC. NO. | SPEC. DESIGN* | TEST CURRENTS | PHYSICAL DAMAGE |
|---|---|---|---|
| 1 | ¼"W, ¼"F painted | .50 × 10⁶A²-S 200 kA | No penetration No delamination |
| 2 | ¼"W, ¼"F painted | .18 × 10⁶A²-S 77 kA | No penetration 3" diameter delamination |
| 3 | ¼"W, ¼"F painted | .6 × 10⁶A²-S 137.5 kA | 2 plies were penetrated 3" diameter delamination |
| 4 | ¼"W, ¼"F no paint | 2 × 10⁶A²-S 200 kA | No penetration 4" diameter delamination |
| 5 | ⅛"W, ⅛"F painted | .51 × 10⁶A²-S 132.5 kA | 1 ply was penetrated 3" diameter delamination |
| 6 | ¼"W, ¼"F painted | 2 × 10⁶A²-S 200 kA | 2 plies were penetrated 4" diameter delamination |
| 7 | ¼"W, ¼"F painted | .56 × 10⁶A²-S 140 kA | 4 plies were penetrated 4" diameter delamination |
| 8 | ¼"W, ¼"F painted | .6 × 10⁶A²-S 140 kA | 4 plies were penetrated 4" diameter delamination |
| 9 | No wire painted | .46 × 10⁶A²-S 134 kA | 1.5" dia. hole thru 4 plies; 5" dia. delamination |
| 10 | Brass wire 0.1"W, 0.1"F painted | .56 × 10⁶A²-S 136.5 kA | 4 plies were penetrated 5" diameter delamination |

*W indicates wire woven in the warp direction and the associated dimension is the wire spacing. F. indicates wire woven in the fill direction and the associate dimension is the wire spacing.

The tests showed that the interwoven wires provided a significant reduction in physical damage to the laminate. For example, specimen No. 6, a painted 4-ply laminate with aluminum wires interwoven in its outer ply and spaced ¼" apart in both the warp and fill directions, withstood the full design current of 200 kA and action integral of $2 \times 10^6 A^2 - S$ without puncture. The interwoven wires also lowered the overall laminate resistivity by about 40%. For example, a twelve inch square specimen with interwoven wires spaced ¼" apart had a resistance between opposite edges of 28.1 milliohms, whereas a similar specimen without wires had a resistance of 49 milliohms.

Further tests have been accomplished on similar size painted specimens with aluminum wires ⅛ inch apart in both warp and fill directions, at current levels up to 235 kA and action integrals up to $2.7 \times 10^6 A^2 - S$. At these levels, only the outer ply was penetrated and delamination of it from the three inner plies was limited to a circular area approximately 3" in diameter. There was no damage to the inner three plies.

On the other hand, it has been found that if the wire or metal filament is woven only unidirectionally, the desired results are not achieved. For example, a 4 mil diameter aluminum wire was woven unidirectionally in Fiberite Corporation style W-133 graphite fabric. The spacing of the wire was 0.25 inch. This material was used in fabrication of a 12 inch by 12 inch, 3 ply test panel. The layup configuration was 0°–90°, ±45°, 0°–90° and the outer 0°–90° ply contained the interwoven wire. The panel was subjected to nearly the full magnitude of component A ($1.57 \times 10^6 A^2 - S$, 192 kA). The test caused severe delamination but was not punctured. The test panel was not painted and had shown slight improvement over previously tested unpainted graphite panels. Previous testing had demonstrated that painted panels are damaged much more severely than unpainted panels when subjected to the same test conditions. It was concluded that, if the test panel containing interwoven wire were painted, the panel would have been penetrated and the damage would be unacceptable. Additionally, due to the slight amount of damage that lightning strikes may inflict upon laminates protected by this invention, major repairs will not be required and in many cases only a simple touch-up will be necessary.

Thus, in laboratory tests of 4-ply laminate incorporating 4 mil aluminum wires spaced ⅛ inch apart in the warp and fill directions of the outer ply, simulated lightning strike currents of average intensity (100 kA, $0.1 \times 10^6 A^2 S$) produced only a slight amount of pitting of the outer ply in the immediate vicinity of the strike attachment. This damage can be repaired simply by sanding away the burned paint, filling the pits with epoxy resin, and repainting. In laboratory tests of the same laminates at very severe levels, (200 kA, $2.4 \times 10^6 A^2 S$), a hole approximately 2 inches in diameter was burned in the outer ply, and this ply was delaminated from the inner plies over an area approximately 4 inches in diameter. The inner plies were not punctured. In this case, the laminate can be repaired by removal of the damaged portion of the outer ply and replacement with a new ply of similar description, also containing interwoven wires.

Due to the small area of damage that results when this invention is utilized for lightning protection of graphite fiber reinforced plastic laminates, loss of mechanical strength in the outer ply will be negligible and the repair can be made by insertion of a patch as described above. However, if additional strength is desired, or in the case where the next inner ply is non-conductive, an overlapping patch or other arrangement may be utilized.

In view of the foregoing, it is clear that the graphite reinforced laminate of this invention with the bidirectional interwoven wire or metal coated filament represents a distinct improvement in protection against the effects of lightning strikes.

We claim:

1. A graphite fiber reinforced laminate structure capable of withstanding the damaging effects of lightning strikes, comprising at least one graphite fiber bonded ply having metal wire or metal coated filament woven therein in the warp and fill directions, said metal wire or filament being compatible with said bonded graphite fibers and being periodically at the outer surface of said laminate, to intensify locally the electrical field upon approach of a lightning arc, to disperse the lightning arc into a plurality of current filaments and facilitate distribution of electric currents throughout said laminate.

2. The laminate structure of claim 1 in which said structure has a plurality of said graphite fiber bonded plies and at least the exterior ply contains said metal wire or filament woven therein.

3. The laminate structure of claim 1 in which said metal wire or filament is selected from the group consisting of aluminum, tin, titanium, brass, gold, silver, platinum, nickel, copper, nickel-stainless steel alloys, stainless steel and graphite, fiberglass and Kevlar fibers coating with one of said metals.

4. The laminate structure of claim 1 in which said metal wire or filament has a diameter of approximately 0.5 mil to about 20 mils.

5. The laminate structure of claim 4 in which said metal wire or filament has a diameter within the range of approximately 1 mil to about 10 mils.

6. The laminate structure of claim 1 in which said ply has at least one of said metal wires or filaments per six tows and said ply has 24 tows per inch.

7. The laminate structure of claim 1 in which said graphite fibers are bonded with an epoxy resin.

8. A graphite fiber reinforced laminate structure capable of withstanding the damaging effects of lightning strikes, comprising at least one graphite fiber bonded ply having metal wire or metal coated filament woven therein in the warp and fill directions, said wire or filament being compatible with said bonded graphite fibers and having a diameter in the range of approximately 0.5 mil to about 20 mils, and said ply having at least one of said metal wires or filaments per 6 tows and having 24 tows per inch, said interwoven wires or filaments being at the outer surface of the exterior ply at periodic intervals, to intensify locally the electric field upon approach of a lightning arc, to disperse the lightning arc into a plurality of current filaments and facilitate distribution of electric currents throughout said laminate.

9. The laminate structure of claim 8 in which said structure comprises a plurality of said plies and the exterior ply contains said metal wire or filament woven therein.

10. The laminate structure of claim 8 in which said metal wire or filament is selected from the group consisting of aluminum, tin, titanium, brass, gold, silver, platinum, nickel, copper, nickel-stainless steel alloys, stainless steel and graphite, fiberglass and Kevlar fibers coating with one of said metals.

11. A graphite fiber reinforced laminate structure capable of withstanding the damaging effects of lightning strikes, comprising a plurality of graphite fiber bonded plies with at least the exterior ply containing metal wire or metal coated filament interwoven therein in the warp and fill directions, said wire or filament being compatible with said bonded graphite fibers and having a diameter of approximately 0.5 mils to about 20 mils, said ply having at least one of said wires or filaments per six tows and 24 tows per inch, and said interwoven wires in said exterior ply being at the outer surface thereof at period intervals where said wires or filaments overlap one another to produce local intensification of the electric field upon approach a lightning arc, disperse the lightning arc into a plurality of current filaments, and facilitate distribution of electric currents throughout said graphite ply and said laminate structure.

12. The laminate structure of claim 11 in which said wire is aluminum and has a diameter in the range of about 1 mil to about 10 mils.

13. The laminate structure of claim 12 in which said graphite fibers are bonded with an epoxy resin and said laminate has four plies.

14. A single ply graphite fiber reinforced laminate structure capable of withstanding the damaging effects of lightning strikes, comprising a graphite fiber bonded ply having metal wire or metal coated filament woven therein bidirectionally, said interwoven wires periodically being at the outer surface of said ply to produce local intensification of the electric field, disperse the lightning arc into a plurality of current filaments and facilitate distribution of electric currents throughout said graphite ply and said laminate structure.

* * * * *